United States Patent
Ellis et al.

(10) Patent No.: US 12,441,375 B2
(45) Date of Patent: Oct. 14, 2025

(54) MAGLEV OR HYPERLOOP STAGGERED TRACK DESIGN FOR REDUCED LANDING GEAR BUMP LOADING

(71) Applicants: SAFRAN LANDING SYSTEMS, Velizy-Villacoublay (FR); SAFRAN LANDING SYSTEMS CANADA INC, Ajax (CA)

(72) Inventors: Andrew Michael Ellis, Moissy-Cramayel (FR); Jeffrey Andrew Jevnikar, Moissy-Cramayel (FR); Graeme Peter Arthur Klim, Moissy-Cramayel (FR); Tareq Deaibes, Moissy-Cramayel (FR)

(73) Assignees: SAFRAN LANDING SYSTEMS, Velizy-Villacoublay (FR); SAFRAN LANDING SYSTEMS CANADA INC., Ajax (CA)

( * ) Notice: Subject to any disclaimer, the term of this patent is extended or adjusted under 35 U.S.C. 154(b) by 816 days.

(21) Appl. No.: 17/720,165

(22) Filed: Apr. 13, 2022

(65) Prior Publication Data

US 2023/0331262 A1     Oct. 19, 2023

(51) Int. Cl.
  *B61B 13/08*    (2006.01)
  *B60L 13/04*    (2006.01)
  *E01B 25/30*    (2006.01)

(52) U.S. Cl.
  CPC .............. *B61B 13/08* (2013.01); *B60L 13/04* (2013.01); *E01B 25/30* (2013.01); *B60L 2200/26* (2013.01)

(58) Field of Classification Search
  CPC ...... B61B 13/08; B60L 13/04; B60L 2200/26; E01B 25/30
  See application file for complete search history.

(56) References Cited

U.S. PATENT DOCUMENTS

| | | | |
|---|---|---|---|
| 11,845,483 B2 * | 12/2023 | Ellis | B61C 1/00 |
| 2023/0331262 A1 * | 10/2023 | Ellis | B61B 13/08 |
| 2025/0060482 A1 * | 2/2025 | Blattner | B61L 23/042 |

FOREIGN PATENT DOCUMENTS

| | | | | |
|---|---|---|---|---|
| CA | 3169873 A1 * | 9/2021 | | B60L 13/04 |
| CN | 108621857 A * | 10/2018 | | B60L 13/04 |
| CN | 112960008 B * | 8/2022 | | B60L 13/04 |
| CN | 109208411 B * | 12/2023 | | E01B 25/30 |
| CN | 113652907 B * | 1/2025 | | B60L 13/04 |
| DE | 20210808 U1 * | 7/2003 | | E01B 25/305 |
| DE | 10224148 A1 * | 12/2003 | | E01B 25/305 |
| DE | 102005030367 B4 * | 8/2008 | | E01B 25/34 |
| FR | 3097814 A1 * | 1/2021 | | E01B 25/30 |

* cited by examiner

*Primary Examiner* — Jason C Smith
(74) *Attorney, Agent, or Firm* — Christensen O'Connor Johnson Kindness PLLC

(57) ABSTRACT

A maglev system includes a maglev vehicle that reciprocates between a levitated state and a non-levitated state. The vehicle includes a capsule supported by a first left wheel and a corresponding first right wheel when the vehicle is in the non-levitated state. The system further includes a track having a left rail and a right rail, each of the left and right rails having a plurality of plates arranged in series. Proximate ends of adjacent plates define a joint. Each rail provides a support surface that the first left and right wheels rollingly engage when the vehicle is in the non-levitated state. The joints of the left rail are offset in a longitudinal direction from the joints of the right rail.

8 Claims, 5 Drawing Sheets

MAGLEV OR HYPERLOOP STAGGERED TRACK DESIGN FOR REDUCED LANDING GEAR BUMP LOADING

BACKGROUND

Magnetically levitated ("maglev") transportation systems, such as a Hyperloop vehicle, provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, maglev systems are able to provide greater travel speeds and improved efficiency. Examples of transportations systems with levitated capsules are disclosed in U.S. Pat. No. 9,604,798, ("Bambrogan et al."), which is currently assigned to Hyperloop Technologies, Inc., the disclosure of which is expressly incorporated herein When traveling at low speeds or stopped, the vehicles do not levitate, but are instead supported by a support system that includes a plurality of independently controlled landing gear assemblies. Like aircraft landing gear, the maglev support systems reciprocate between an extended (deployed) position and retracted (stowed) position by extending and retracting the individual landing gear assemblies. When the vehicles are levitated, the support system is retracted, and the wheels of the landing gear assemblies do not contact the ground. When the vehicles are traveling at low speeds or stopped, the support system is extended so that the wheels of the landing gear assemblies contact parallel track to support the vehicles.

In some arrangements, the landing gear assemblies are grouped on two or more independent bogies (like a train). Each landing gear assembly includes a wheel assembly that is extendable and retractable by an actuator. The actuator, which may be hydraulic, electric, pneumatic, etc., is configured to control the position of the wheel assembly so that the landing gear assemblies control the height of the vehicle relative to the ground interface (track) when the vehicle is supported by the support system.

FIG. 1 shows a plan view of a typical maglev vehicle 60 and a known track 80. Various components of the maglev vehicle 60 and the track 80 will be described with the understanding that some components are located on the left side of the vehicle 60 or track 80 and have a corresponding component located on the right side of the vehicle 60 or track 80. Such components are described herein with a generic reference number XX that could be located on the left or right side of the vehicle 60 or track 80. When a component XX is specifically described as being located on the left or right side of the vehicle 60 or track 80, the component is indicated with a reference number XXL or XXR, respectively, with the understanding that features of the components XXL and XXR correspond to features described and indicated with a reference number XX unless otherwise noted. For example, left rail 82L and 82R shown in FIG. 1 correspond to rail 82 shown in FIG. 2 as well as to each other and should be considered similar unless otherwise noted.

Referring back to FIG. 1, the vehicle 60 in includes a capsule 62, i.e., a cabin, with a plurality of Halbach arrays 64 to levitate and propel the vehicle. The vehicle further includes a bogie 66 with a plurality of retractable landing gear that cooperate to support the capsule 62. When the vehicle 60 is in a non-levitating state, such approaching, leaving, or docked at a station, the landing gear extend downward so that the forward wheels 68 and rear wheels 70 of the bogie 66 contact the track 80. When the vehicle 60 is moving at high speeds, the landing gear is retracted, and interaction of the Halbach arrays 64 with the track 80 generates a magnetic field that supports, i.e., levitates the capsule 62.

Each rail 82 is formed from a plurality of elongate metal plates 84 arranged in seriatim. The ends of adjacent plates 84 meet at a joint 88. The top of each plate 84 defines a generally flat support surface 86. When the vehicle 60 is in a non-levitating state, landing gear 68L, 70L on the left side of the vehicle 60 extend downward and contacts the support surface 86L. Similarly, landing gear 68R, 70R on the right side of the vehicle extend downward and contacts the support surface 86R. Thus, the left rail 82L and the right rail 82R cooperate to provide a pair of parallel, generally contiguous support surfaces 86L and 86R that support the vehicle 60 when the vehicle is in a non-levitating state.

Each plate 84 is at least partially formed from a metal, such as aluminum, for example. In some embodiments, the maglev vehicles includes a plurality of Halbach arrays 64 configured to provide passive magnetic levitation in response to the presence of the metal plates 84. That is, the Halbach arrays 64 and the metal plates 84 generate lifting forces to levitate the vehicle.

Referring now to FIG. 2, a side view of a typical joint 88 of a known rail 82 is shown. Because of manufacturing and assembly/installation tolerances, vertical mismatches and horizontal gaps can be present between the ends of adjacent plates 84. Further, a nominal gap may exist between adjacent plates 84 to account for thermal expansion. These and other potential discontinuities at the joints 88 impart an impulse force on the landing gear when a wheel of landing gear rolls over the joint 88.

Referring back to FIG. 1, for known tracks 80 for maglev vehicles 60, the joints 88L and 88R of the left rail 82L and the right rail 82R, respectively, are aligned. As a result, when the left forward wheel 68L rolls over a joint 88L of the left rail 82L, the corresponding right forward wheel 68R simultaneously rolls over a joint 88R of the right rail 82R. Similarly, when the left rear wheel 70L rolls over a joint 88L of the left rail 82L, the corresponding right rear wheel 70R simultaneously rolls over a joint 88R of the right rail 82R.

Discontinuities at the joints 88 impart bump loads (impulses) into the wheels 68, 70 as the wheels roll over the joints. As shown in FIG. 3, resulting bump loads are experienced simultaneously by the left and right front wheels 68L, 68R and also, simultaneously by the left and right rear wheels 70L, 70R. When bump loads are experienced simultaneously by corresponding wheels 68L, 68R or 70L, 70R, the bogie 66 and, therefore, the capsule 62 can experience a pitching motion (rotation about a transverse axis) that can be uncomfortable and unsettling to passengers. Further, this additional motion can result in increased design loads that require more robust and heavier structure.

SUMMARY

The present disclosure provides examples of a maglev system with a maglev vehicle, such as a hyperloop vehicle, and an associated track. In an embodiment, the maglev vehicle reciprocates between a levitated state and a non-levitated state. The vehicle includes a capsule, a first left wheel, and a first right wheel corresponding to the left wheel. The first left and right wheels at least partially support the capsule when the vehicle is in the non-levitated state. The track includes a left rail and a right rail, each of the left and right rails having a plurality of plates arranged in seriatim. Proximate ends of adjacent plates define a joint, and each rail provides a support surface. The first left and right wheels rollingly engage the support surface of the left and right rails, respectively, when the vehicle is in the non-levitated state. The joints of the left rail are offset in a longitudinal direction from the joints of the right rail.

In any embodiment, the joints of the left rail and the right rail are positioned such that only one of the first left wheel and the first right wheel is in contact with a joint at a given time.

In any embodiment, the vehicle comprises a bogie mounted to the capsule, the first left and right wheels are rotatably mounted to one end of the bogie, and second left and right wheels are rotatably mounted to a second end of the bogie.

In any embodiment, the joints of the left rail and the right rail are positioned such that only one of the first left wheel, the first right wheel, the second left wheel, and the second right wheel is in contact with a joint at a given time.

In any embodiment, each plate has a length L, each joint of the left rail being offset from a corresponding joint of the right rail by a distance d, wherein the distance d is a percentage of the length L.

In any embodiment, the percentage is one of 50%, 25%, or 10%.

In any embodiment, the vehicle comprises a plurality of Halbach arrays configured to react with the track to selectively levitate the vehicle.

In accordance with another embodiment a track is provided for a maglev vehicle having a plurality of left wheels and corresponding right wheels that support the vehicle when the vehicle is in a non-levitated state. The track comprises a left rail having a plurality of left rail plates arranged in seriatim, each end of each left rail plate defining a left joint with an end of an adjacent left rail plate, the left rail defining a left support surface. The track further comprises a right rail parallel to the left rail and having a plurality of right rail plates arranged in seriatim, each end of each right rail plate defining a right joint with an end of an adjacent right rail plate, the right rail defining a right support surface. The plurality of left wheels and corresponding right wheels rollingly engage the left and right support surfaces, respectively, when the vehicle is in the non-levitated state. Each left joint is offset from a corresponding right joint in a longitudinal direction.

In any embodiment, each of the left joints is offset from the corresponding right joint such that one of the plurality of left wheels is not in contact with a left joint when one of the plurality of right wheels is in contact with the corresponding right joint.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The following discussion provides examples of a track suitable to support a maglev vehicle when the maglev vehicle is in a non-levitated state. The disclosed track is configured such that when a particular landing gear wheel experiences a bump load imparted by a discontinuity at the joint of a track rail, a bump load is not simultaneously imparted to the corresponding landing gear wheel on the other rail.

Figure 4:
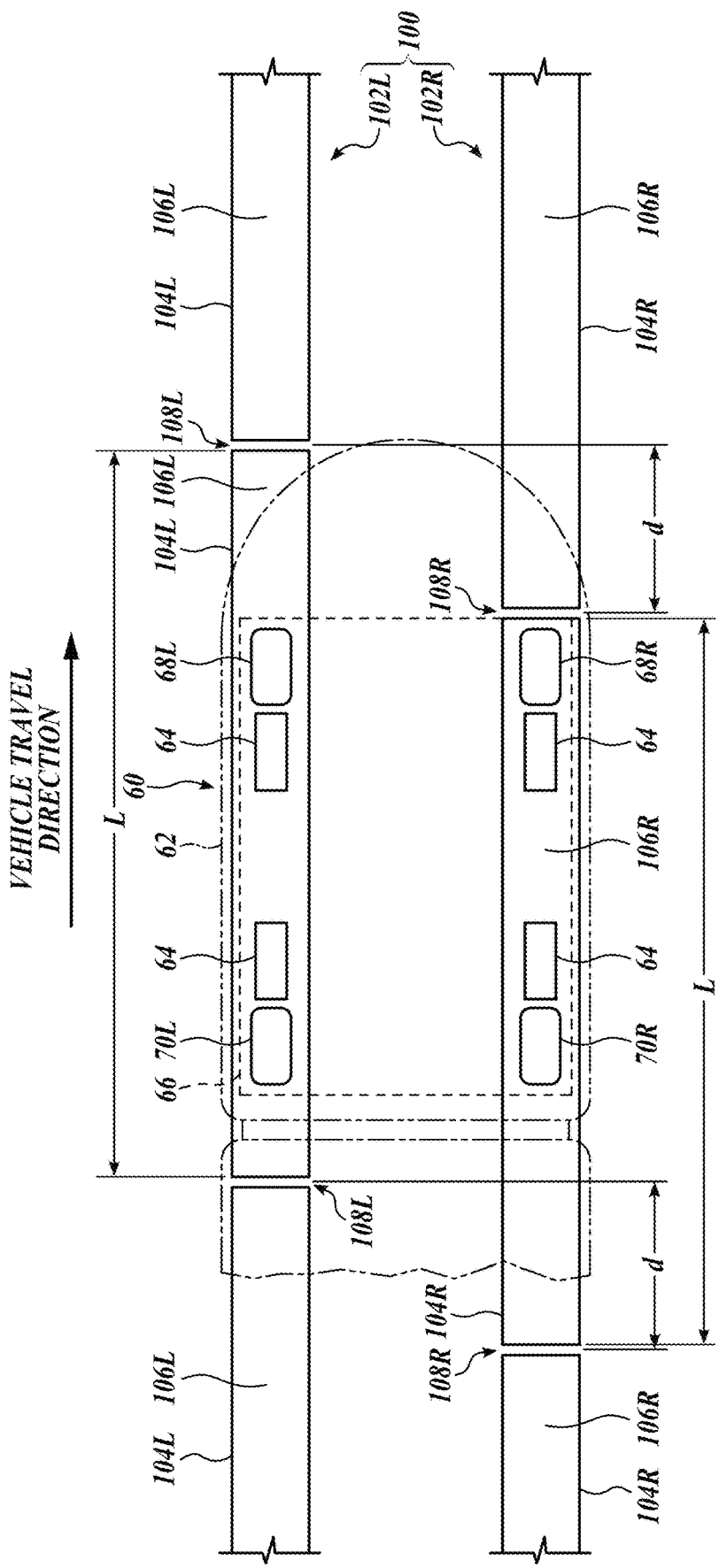
FIG. 4 is schematic plan view of a maglev vehicle on a track in accordance with an embodiment of the present disclosure.

FIG. 4 illustrates an embodiment of a track 100 for a maglev vehicle 60 that is configured such that bump impulses are imparted on the landing gear wheels 68 and 70 in staggered fashion. That is, only one wheel 68 and 70 experiences a bump impulse at a given time so that the vehicle 60 does not experience the previously described pitching motion caused by known tracks. In some embodiments, the landing gear wheels 68 and 70 may be part of landing gear of the type disclosed in U.S. Pat. No. 10,549, 848 ("Klim et al."), which is currently assigned to Safran Landing Systems Canada Inc., the disclosure of which is expressly incorporated herein.

Figure 1:
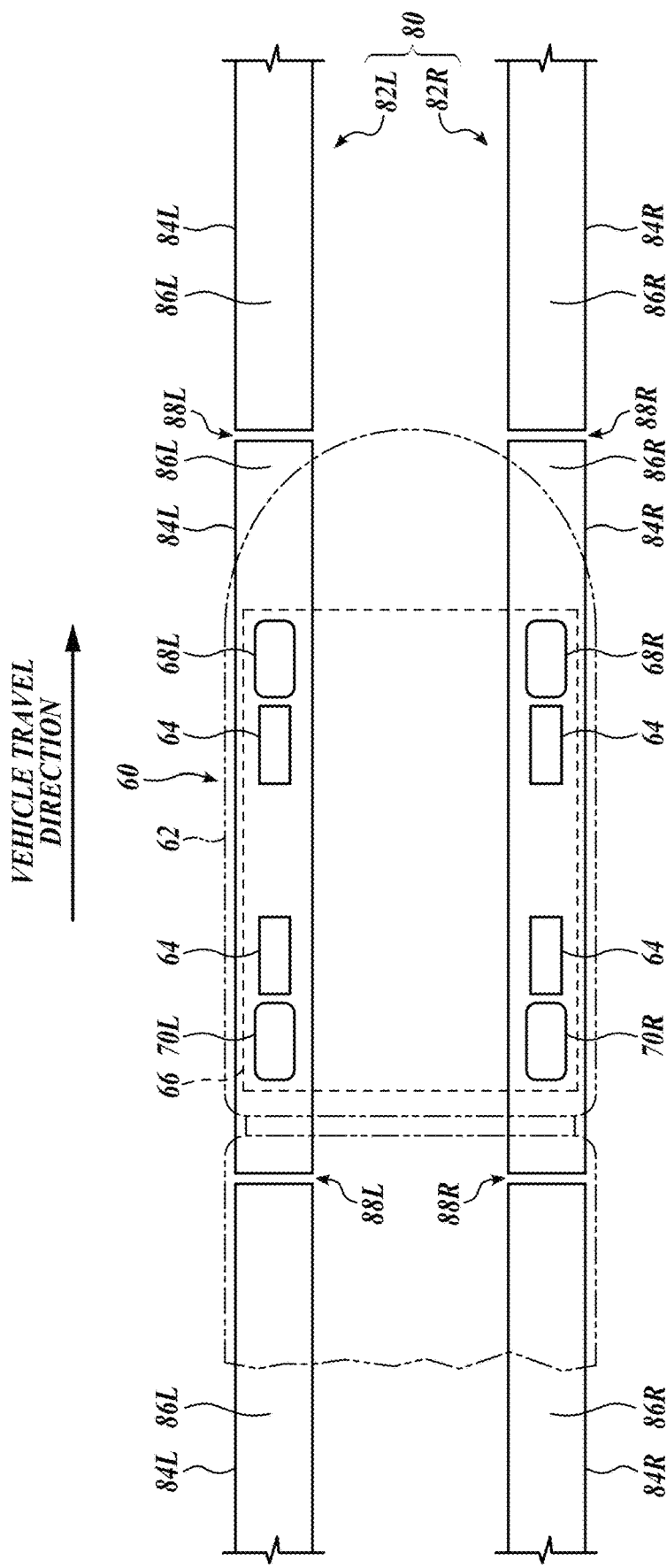
FIG. 1 is schematic plan view of a maglev vehicle on a known track.
Figure 2:
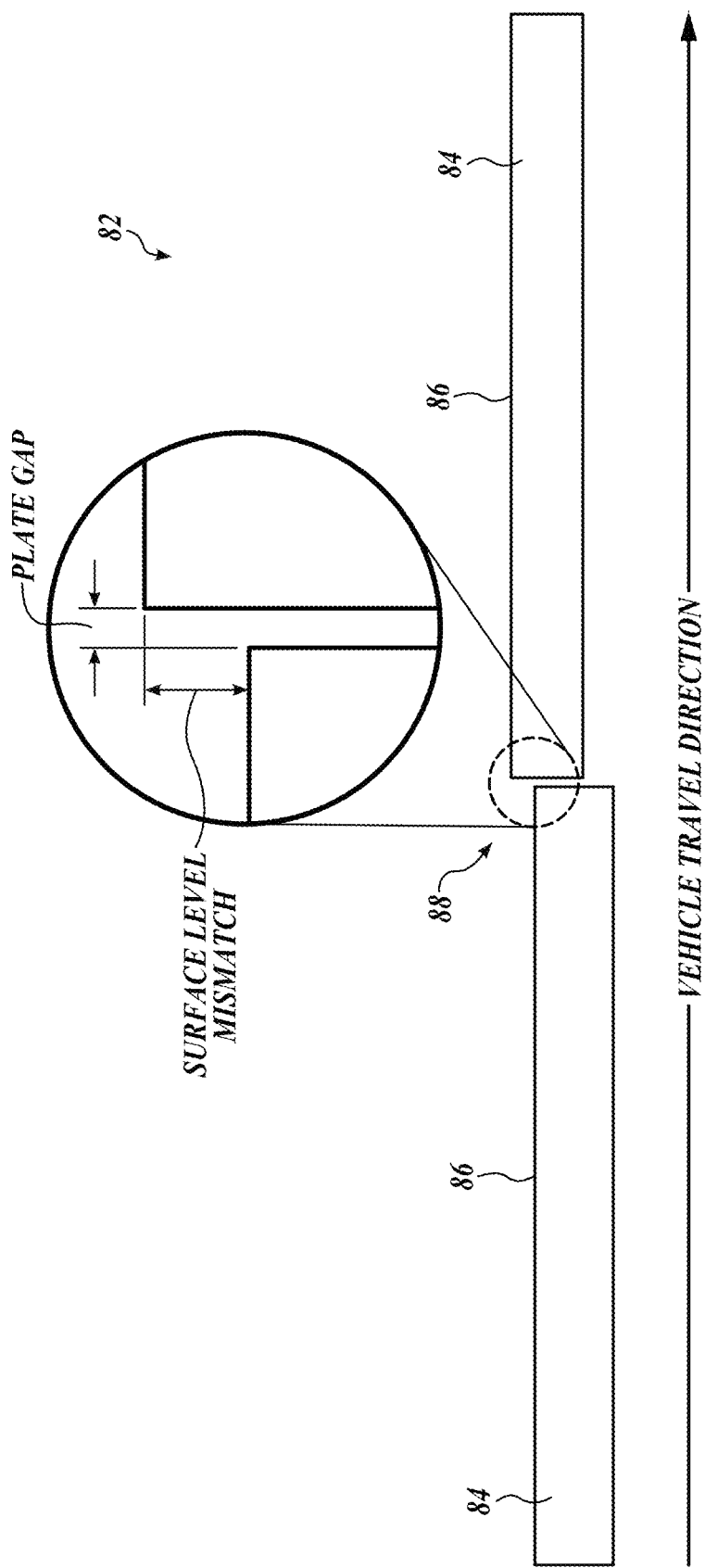
FIG. 2 is a side view of a joint of the track shown in FIG. 1.
Figure 3:
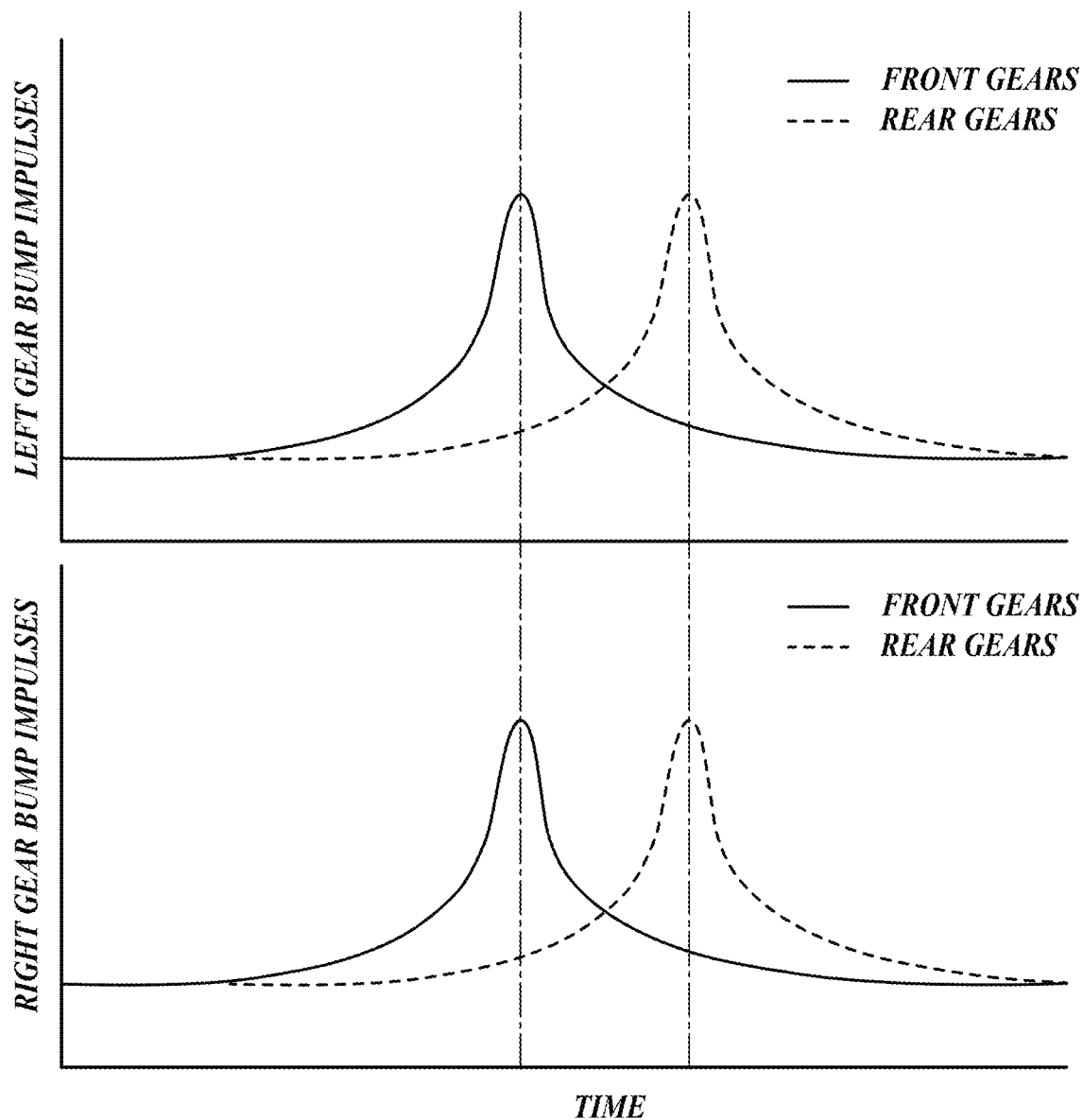
FIG. 3 is a graph of bump impulses experienced by the landing gear of the maglev vehicle shown in FIG. 1.

As shown in FIG. 4, the track 100 according to aspects of the present disclosure is shown. Components of the track 100 shown in FIG. 4 that are labeled with reference number 10X correspond to similar components labeled with reference number 8X in FIG. 1, except as noted. As shown in FIG. 4, the joints 108L, 108R of the track are staggered. That is, each joint 108L of the left rail 102L is offset in the longitudinal direction from the closest, i.e., corresponding, joint 108R of the right rail 102R by a distance d. As used herein, the longitudinal direction is parallel to the direction of vehicle travel on a particular portion of the track 100, and the offset can be in either the forward or rearward direction.

Figure 5:
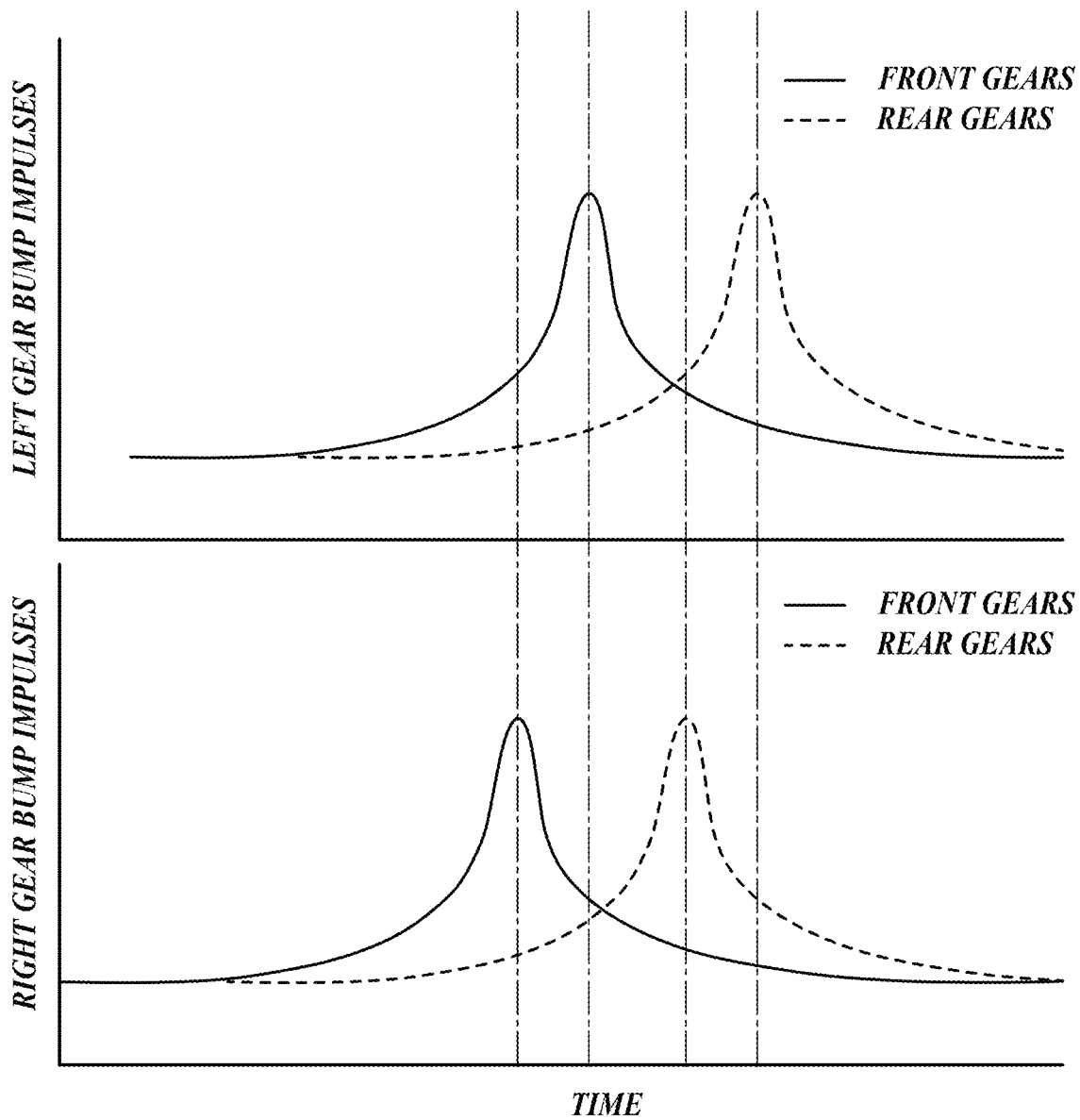
FIG. 5 is a graph of bump impulses experienced by the landing gear of the maglev vehicle shown in FIG. 4.

Referring now to FIG. 5, the distance d is defined so that the bump impulse of a left landing gear wheels 68L and 70L is offset from the bump impulse of the corresponding right landing gear wheels 68R and 70R, respectively. In some embodiments, only a single wheel of a bogie 66 contacts a joint at any given time. In some embodiments, the distance d is defined so that only one landing gear wheel 68L, 68R, 70L, 70R contacts a joint 108 at a time. In some embodiments, the distance d is 50%, 25%, 10%, or any other suitable percentage the length L of a rail plate 104. In some embodiments, the distance d is any suitable percentage of the length L of a rail plate 104 to minimize the overlap of the bump impulses imparted on the wheels.

By minimizing the overlap of bump impulses, the disclosed track 100 minimizes any pitching motion introduced to the capsule 62 of the vehicle 60 to improve the ride experience of passengers within the capsule 62. Further, by reducing the overall bump impulses experienced by the bogie 66 at a given time, the structural capability required of the bogie is reduced. This, in turn, allows for a lighter bogie 66, thereby reducing manufacturing and operation costs.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A maglev system, comprising:
   a maglev vehicle that reciprocates between a levitated state and a non-levitated state, the vehicle including a capsule, a first left wheel, and a first right wheel corresponding to the left wheel, the first left and right wheels at least partially supporting the capsule when the vehicle is in the non-levitated state; and
   a track comprising a left rail and a right rail, each of the left and right rails having a plurality of plates arranged in seriatim and extending in a longitudinal direction, proximate ends of adjacent plates defining a joint, each rail providing a support surface,
   wherein the first left and right wheels rollingly engage the support surface of the left and right rails, respectively, when the vehicle is in the non-levitated state, the joints of the left rail being offset in the longitudinal direction from the joints of the right rail, and the joints of the left rail and the right rail are positioned such that only one of the first left wheel, the first right wheel, the second left wheel, and the second right wheel is in contact with a joint at a given time.

2. The maglev system of claim 1, wherein the joints of the left rail and the right rail are positioned such that only one of the first left wheel and the first right wheel is in contact with a joint at a given time.

3. The maglev system of claim 1, wherein the vehicle comprises a bogie mounted to the capsule, the first left and right wheels being rotatably mounted to one end of the bogie, second left and right wheels being rotatably mounted to a second end of the bogie.

4. The maglev system of claim 1, wherein each plate has a length L, each joint of the left rail being offset from a corresponding joint of the right rail by a distance d, wherein the distance d is a percentage of the length L.

5. The maglev system of claim 4, wherein the percentage is one of 50%, system 25%, or 10%.

6. A track for a maglev vehicle having a plurality of left wheels and corresponding right wheels that support the vehicle when the vehicle is in a non-levitated state, the track comprising:
   a left rail comprising a plurality of left rail plates arranged in seriatim and extending in a longitudinal direction, each end of each left rail plate defining a left joint with an end of an adjacent left rail plate, the left rail defining a left support surface; and
   a right rail parallel to the left rail and comprising a plurality of right rail plates arranged in seriatim and extending in the longitudinal direction, each end of each right rail plate defining a right joint with an end of an adjacent right rail plate, the right rail defining a right support surface,
   wherein the plurality of left wheels and corresponding right wheels rollingly engage the left and right support surfaces, respectively, when the vehicle is in the non-levitated state, each left joint being offset from a corresponding right joint in the longitudinal direction, and the joints of the left rail and the right rail are positioned such that only one of the plurality of first left wheel, the first right wheel, the second left wheel, and the second right wheel is in contact with a joint at a given time.

7. The track of claim 6, wherein each left plate and right plate has a length L, each left joint being offset from a corresponding right joint by a distance d, wherein the distance d is a percentage of the length L.

8. The track of claim 7, wherein the percentage is one of 50%, 25%, or 10%.

\* \* \* \* \*